United States Patent [19]

Heng et al.

[11] Patent Number: 4,775,107

[45] Date of Patent: Oct. 4, 1988

[54] METHOD OF PROCESSING SMALL BATTERIES

[75] Inventors: Rudolf Heng, Oberursel; Walter Koch, Mühleim; Hartmut Pietsch, Bad Homburg, all of Fed. Rep. of Germany

[73] Assignee: Metallgesellschaft AG, Frankfurt am Main, Fed. Rep. of Germany

[21] Appl. No.: 40,911

[22] Filed: Apr. 21, 1987

[30] Foreign Application Priority Data

Apr. 26, 1986 [DE] Fed. Rep. of Germany ....... 3614242

[51] Int. Cl.⁴ .............................................. B02C 19/12
[52] U.S. Cl. ........................................ 241/23; 241/24; 241/29; 241/DIG. 38
[58] Field of Search .................. 241/29, 26, 23, 24, 241/79.1, 78, DIG. 14, DIG. 38, 19

[56] References Cited

U.S. PATENT DOCUMENTS 4,384,683 5/1983 Huwald et al. ...................... 241/23

FOREIGN PATENT DOCUMENTS 3402196 7/1985 Fed. Rep. of Germany .
57-30273 2/1982 Japan .

OTHER PUBLICATIONS

Lueger, Lexikon der Technik, "Arbeitsweise I. M. mit teilweiser Prallzerkleinerung", Hazemag Prallmühle, V. 4.

*Primary Examiner*—Mark Rosenbaum
*Attorney, Agent, or Firm*—Sprung Horn Kramer & Woods

[57] ABSTRACT

A mechanical disintegration is effected in which substantially only the metal sheath of the small batteries is torn apart. The crushed material is roasted at 500° to 1000° C. in a state of motion in an oxidizing atmosphere and the volatilized mercury is recovered from the exhaust gas. The roasted material is separated by sieving and magnetic separation into an iron-containing scrap fraction, a brass-containing scrap fraction and a collectable fraction, which contains manganese, zinc and silver.

6 Claims, No Drawings

METHOD OF PROCESSING SMALL BATTERIES

This invention relates to a method or processing small batteries by mechanical disintegration and separating into different fractions.

The term "small batteries" includes all kinds of small batteries, such as are used for radio sets, pocket computers, pocket lamps, watches and clocks, listening aids, etc. The term does not include large storage batteries, such as are used for automobiles.

Such batteries contain metallic constituents, such as Fe, Ni, Cu, Ag, Cd, as well as chemical compounds, such as salts of manganese or zinc. They have also certain contents of paper and plastics.

Until recently, the spent batteries were disposed of only in the normal household garbage or by incineration although that practice contaminates the environment.

More recently said batteries have been separately collected. But great difficulties are encountered in an ecologically satisfactory elimination of said batteries.

DE-A-No. 3 402 196 discloses a method of processing such batteries in which the batteries are mechanically disintegrated and are then subjected to a chlorinating roasting. The residue formed by the chlorinating roasting is leached with an aqueous solution which contains dilute hydrochloric acid so that a major part of the non-ferrous metals is dissolved and is then separated by a cementation with metallic zinc. The Zn-containing remaining solution can be used to produce zinc salts. That method permits of a processing in which a formation of polluting by-products is avoided but the chlorinating roasting involves a certain expenditure, which is not desired in some cases. Besides, the acid-insoluble iron content of the calcine is dumped so that it is lost.

JP-A-No. 57-30 273 discloses a method of processing buttonlike batteries, which are initially heat-treated to burn plastics and rubber, whereafter the negative cap is detached and mercury is evaporated. This is succeeded by a disintegration in a beater crusher, such as a hammer mill, whereby the negative cap is separated from the positive housing. The valuable metals of the housing are separated by magnetic attraction and sieving. After the sieving the nonmagnetic caps are disintegrated once more. That process can be used only for buttonlike batteries.

It is an object of the invention to eliminate in an economical, ecologically satisfactory manner any desired mixture of small batteries in such a manner that the non-ferrous metals and the iron content are recovered as fully as possible.

That object is accomplished in accordance with the invention in that the mechanical disintegration effects substantially only a tearing apart of the metal sheath of the small batteries, the disintegrated material is treated in a state of motion in an oxidizing atmosphere at 500° to 1000° C., the volatile mercury is recovered from the exhaust gas, and the roasted material is separated by a sieving step and magnetic separation into an iron-containing scrap fraction, a brass-containing scrap fraction, and a collectable fraction, which contains manganese, zinc and silver. The mechanical disintegration is effected in such a manner that substantially only the metal sheaths are torn apart so that coarse metal particles are formed and the content of the battery is exposed. The iron and the non-ferrous metals, such as Cu and Zn, are not forged together, as would be the result of a substantial disintegration in a hammer mill. By the subsequent oxidizing roasting, virtually all mercury is volatilized and combustible components, such as paper, plastics and graphite, are burnt. The mercury is recovered from the exhaust gas by known methods. A major part of the iron content enters the iron-containing scrap fraction. The brass-containing scrap fraction consists mainly of zinc and copper. The collectable fraction contains substantial amounts of manganese and zinc and virtually all silver and a major part of the remaining non-ferrous metals. That collectable fraction can be leached for a separation of the valuable metals.

In a preferred embodiment, the mechanical disintegration is effected in an impact crusher. An impact crusher very effectively meets the requirements for crushing.

In a preferred embodiment the crushed material is heat-treated in a multiple-bed furnace. A multiple-bed furnace very effectively meets the requirements for an oxidizing roasting in an atmosphere which remains free of gaseous or vaporous roasted products.

In a preferred embodiment, the roasted material obtained by the heat treatment is separated by sieving into a fine fraction, a medium fraction and a coarse fraction, the medium fraction is subjected to a second mechanical disintegration, the discharged matter is separated by a second sieving step into a fine fraction and a coarser fraction, the coarser fraction is subjected to a third disintegrating step, the discharged matter is separated by a third sieving step into a fine fraction and a coarser fraction, and the coarser fraction is separated by magnetic separation into a brass-containing scrap fraction and an iron-containing fraction. The fine fractions will constitute the collectable fraction. The coarse fraction separated by the first sieving step and the magnetic fraction separated by the magnetic separation constitute the iron-containing scrap fraction. The non-magnetic fraction separated by the magnetic separation constitutes the brass-containing scrap fraction. The first and second mechanical disintegrating steps may be effected in two separate impact crushers or may be effected in a batch operation in an impact crusher having a variable gap width. The third disintegrating step consists of a grinding to a small size. That processing results in a substantial separation and concentration of the fractions.

In a preferred embodiment the fine fractions are sieved off in a particle size of 1 to 2 mm and the medium fraction is separated by the first sieving step in a particle size up to 20 mm. Particularly good separations are effected with these sieve cuts.

In a preferred embodiment the third disintegrating step is effected in a rod or ball mill. Said mills very effectively meet the requirements for the grinding in the third crushing step.

The invention will be explained more in detail with reference to an example.

The batteries had the following composition:

| | |
|---|---|
| Moisture | ~5% |
| Fe | 18% |
| SiO$_2$ | 0.66% |
| Al$_2$O$_3$ | 0.44% |
| CaO | 0.2% |
| K | 1.05% |
| Mn | 16.1% |
| Cr | 0.01% |
| Ni | 0.1% |
| Pb | 0.06% |

-continued

| | |
|---|---|
| Zn | 18.0% |
| Cu | 0.54% |
| Cd | 0.008% |
| Hg | 0.182% |
| Ag | 174 mg/kg |
| $C_{total}$ | 10% |
| $S_{total}$ | 0.08% |
| Cl | 2.8% |

The first mechanical disintegrating step was effected in an impact crusher. The disintegrated material was then roasted in a multiple-bed furnace in an oxidizing atmosphere and at a temperature not in excess of 800° C. The exhaust gas contained 14.17% of the charged material. The roasted material was separated by sieving into a fine fraction below 1 mm, a medium fraction of 1 to 20 mm, and a coarse fraction above 20 mm. The fine fraction constituted 48.1% of the charged material, the medium fraction of 21.66% of the charged material, and the coarse material of 16.07% of the charged material. For a second mechanical disintegrating step the medium fraction was fed to an impact crusher having a small gap width and was subsequently separated in a second sieving step into a fine fraction below 1 mm and a coarse fraction above 1 mm. The fine fraction consisted of 11.9% of the charged material and the coarser fraction of 9.73% of the charged material. In the third disintegrating step the coarser fraction was disintegrated in a rod mill and was subsequently separated in a third sieving step into a fine fraction below 1 mm and a coarser fraction above 1 mm. The fine fraction consisted of 6.1% of the charged material and the coarser fraction of 3.63% of the charged material. By magnetic separation the coarser fraction was separated into a brass-containing scrap fraction amounting to 1.03% of the charged material and an iron-containing scrap fraction amounting to 2.6% of the charged material.

The collectable fraction consisting of the combined fine fractions had the following composition:

| | |
|---|---|
| Fe | 8% |
| $SiO_2$ | 4.3% |
| $Al_2O_3$ | 0.73% |
| CaO | 1.9% |
| K | 2.2% |
| Mn | 20.8% |
| Cr | 0.46% |
| Ni | 0.85% |
| Pb | 0.08% |
| Zn | 26.5% |
| Cu | 0.3% |
| Cd | 0.12% |
| Hg | 0.029% |
| Ag | 318 mg/kg |
| $C_{total}$ | 5.6% |
| $S_{total}$ | 1.0% |
| Cl | 4.2% |

The brass-containing fraction separated by magnetic separation had the following composition:

| | |
|---|---|
| Fe | 3.77% |
| Mn | 0.16% |
| Cr | 0.86% |
| Ni | 1.98% |
| Pb | 0.02% |
| Zn | 34.25% |
| Cu | 57.67% |
| Cd | 0.002% |

-continued

| | |
|---|---|
| Ag | 7.4 mg/kg |

The iron-containing scrap fraction consisting of the coarse fraction separated by the first sieving step and the magnetic fraction separated by the magnetic separation had the following composition:

| | |
|---|---|
| Fe | 87.7% |
| Mn | 1.6% |
| Ni | 0.06% |
| Pb | 0.01% |
| Zn | 2.33% |
| Cu | 0.06% |
| Cl | 1.07% |

The advantages afforded by the invention reside in that any desired small batteries can be processed to provide fractions in which individual valuable metals are highly enriched, all metals can be recovered and an ecologically satisfactory disposal can be effected.

We claim:

1. A method of processing small batteries such as are used for radio sets, pocket computers, watches, clocks listening aids and other similar articles comprising the steps of mechanically disintegrating said batteries, and subsequently separating said disintegrated batteries wherein said step of mechanically disintegrating said batteries effects substantially only a tearing of a metal sheath of said batteries, roasting said disintegrated batteries prior to said separating step by heat treating them in a state of motion in an oxidizing atmosphere at 500° to 1000° C., recovering volatile mercury from exhaust gas produced by said roasting step, and said separating step including the sizing and a magnetic separation of said roasted materials to produce an iron containing scrap fraction, a collectable fraction including maganese, zinc, and silver, and a brass containing scrap fraction.

2. A method according to claim 1, characterized in that the mechanical disintegration is effected in an impact crusher.

3. A process according to claim 1, characterized in that the heat treatment of the disintegrated material is effected in a multiple-bed furnace.

4. A process according to any of claims 1, 2 or 3, characterized in that the roasted material obtained by the heat treatment is separated by sieving into a fine fraction, a medium fraction and a coarser fraction, the medium fraction is subjected to a second mechanical disintegration to form discharged matter, the discharged matter is separated by a second sieving step into a fine fraction and a coarser fraction, the coarser fraction is subjected to a third disintegrating step to result in a second discharged matter, the second discharged matter is separated by a third sieving step into a fine fraction and a coarser second fraction, and the coarser second fraction is separated by magnetic separation into a brass-containing scrap fraction and an iron-containing fraction.

5. A process according to claim 4, characterized in that the fine fractions obtained by the sieving steps have a particle size of 1 to 2 mm and the medium fraction obtained by the first sieving step has a particle size up to 20 mm.

6. A process according to claim 4, characterized in that the third disintegrating step is effected in a rod mill or ball mill.

* * * * *